(12) United States Patent  
Sugiura et al.

(10) Patent No.: US 9,182,908 B2  
(45) Date of Patent: Nov. 10, 2015

(54) METHOD AND ELECTRONIC DEVICE FOR PROCESSING HANDWRITTEN OBJECT

(71) Applicant: KABUSHIKI KAISHA TOSHIBA, Minato-ku, Tokyo (JP)

(72) Inventors: Chikashi Sugiura, Hamura (JP); Tatsunori Saito, Sagamihara (JP)

(73) Assignee: KABUSHIKI KAISHA TOSHIBA (JP)

( * ) Notice: Subject to any disclaimer, the term of this patent is extended or adjusted under 35 U.S.C. 154(b) by 8 days.

(21) Appl. No.: 13/937,993

(22) Filed: Jul. 9, 2013

(65) Prior Publication Data

US 2015/0016726 A1    Jan. 15, 2015

(51) Int. Cl.  
*G06F 3/0488* (2013.01)

(52) U.S. Cl.  
CPC .................................. *G06F 3/04883* (2013.01)

(58) Field of Classification Search  
CPC ..... G06F 3/017; G06F 3/04883; G06F 3/041; G06F 3/04886; G06F 2203/04808; G06F 3/0488; G06F 17/242; G06F 17/30277; G06K 9/222; G06K 9/00422; G06K 9/00402; G06K 96/00167  
USPC .................................................... 382/181, 189  
See application file for complete search history.

(56) References Cited

U.S. PATENT DOCUMENTS

2010/0127991 A1* 5/2010 Yee ............................... 345/173  
2011/0307505 A1* 12/2011 Ito ................................. 707/769  
2014/0015776 A1* 1/2014 Kim et al. ..................... 345/173

FOREIGN PATENT DOCUMENTS

JP        2012-510109 A        4/2012

* cited by examiner

*Primary Examiner* — Edward Park  
(74) *Attorney, Agent, or Firm* — Knobbe Martens Olson & Bear LLP

(57) ABSTRACT

According to one embodiment, a handwriting process method includes displaying a handwritten object on a touch-screen display of an electronic device, the handwritten object includes a plurality of strokes, the plurality of strokes being input by handwriting, detecting a touch operation at a location on at least part of the handwritten object on the touch-screen display, and executing a first process determined according to a shape of the handwritten object, if the touch operation is detected.

14 Claims, 15 Drawing Sheets

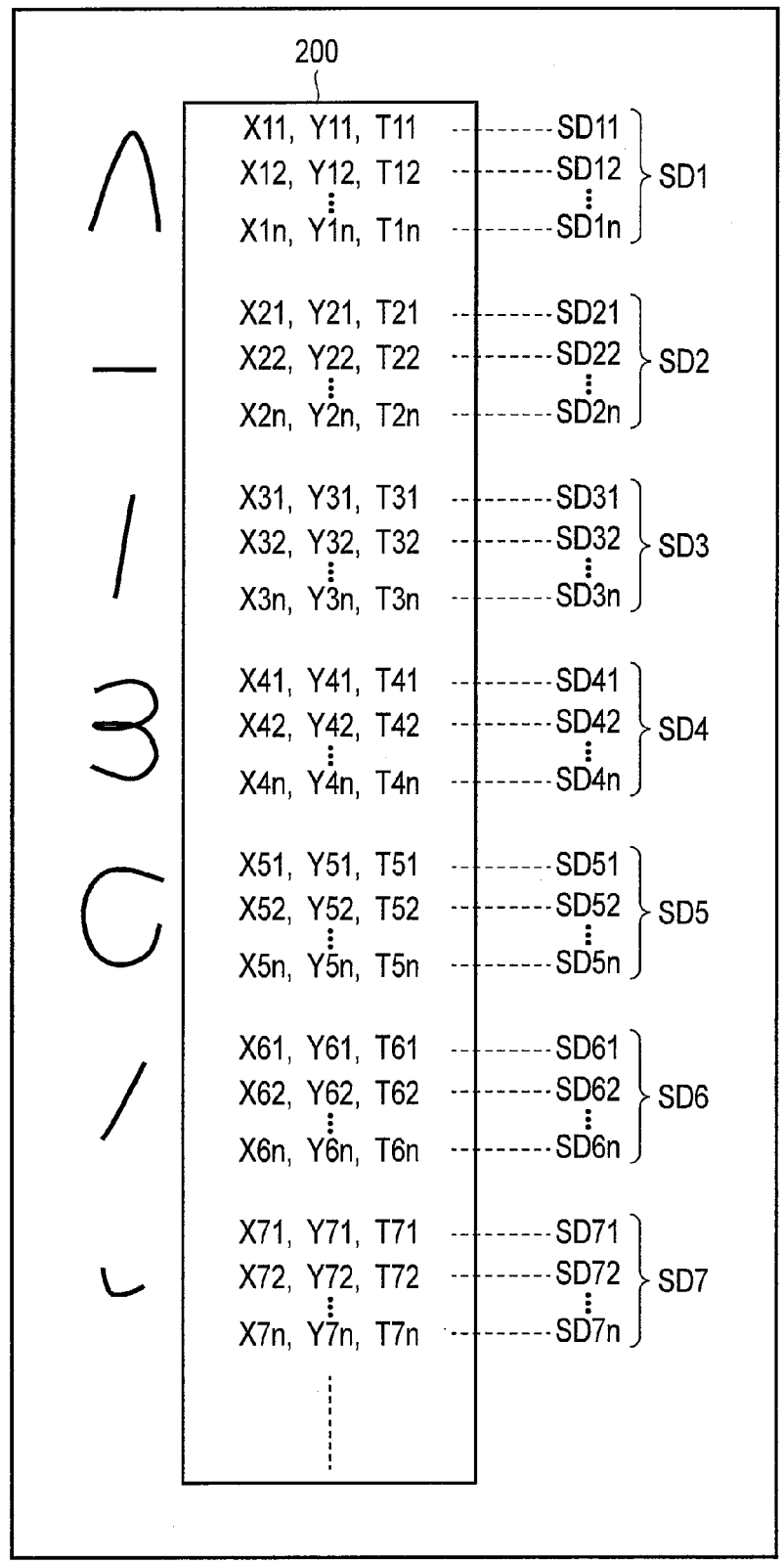
F I G. 4

| Object element | Handwritten element (stroke(s)) |
|---|---|
| Outer frame | ST1 |
| Long hand | ST6 |
| Short hand | ST5 |
| Second hand | None |
| Central point | ST2~ST4 |
| Top, bottom, left, right | (X1,Y1), (X2,Y2), (X3,Y3), (X4,Y4), |
|  |  |

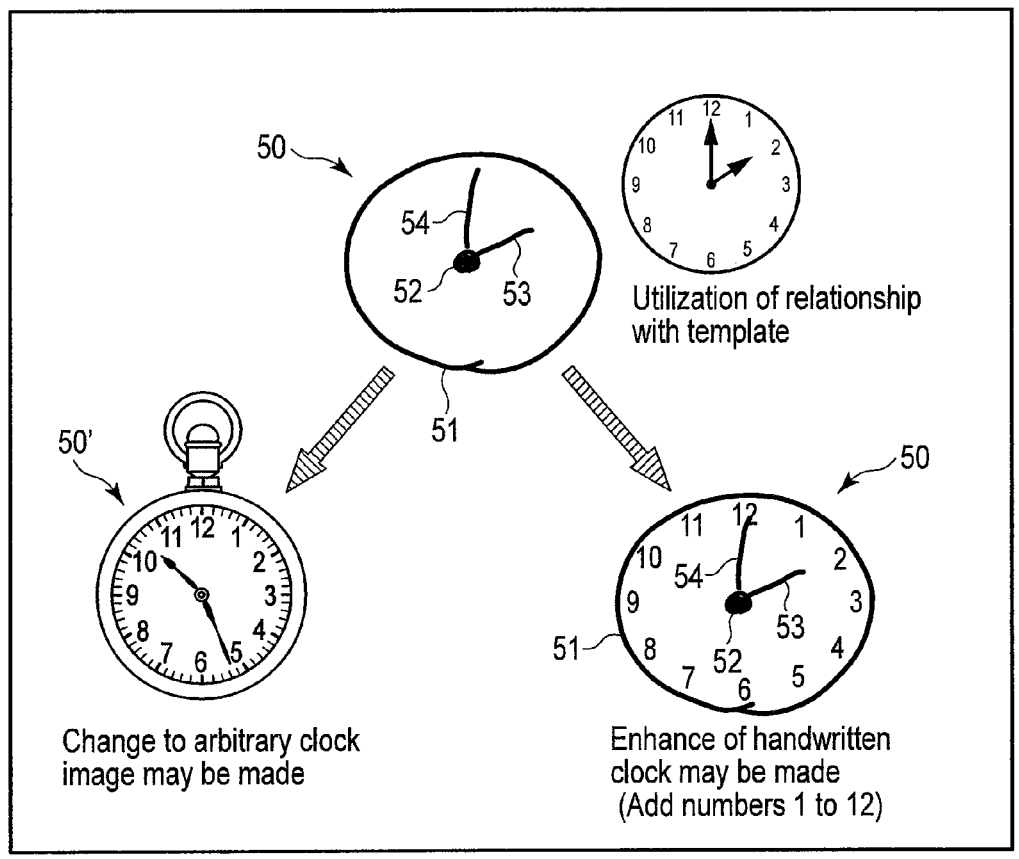
F I G. 12

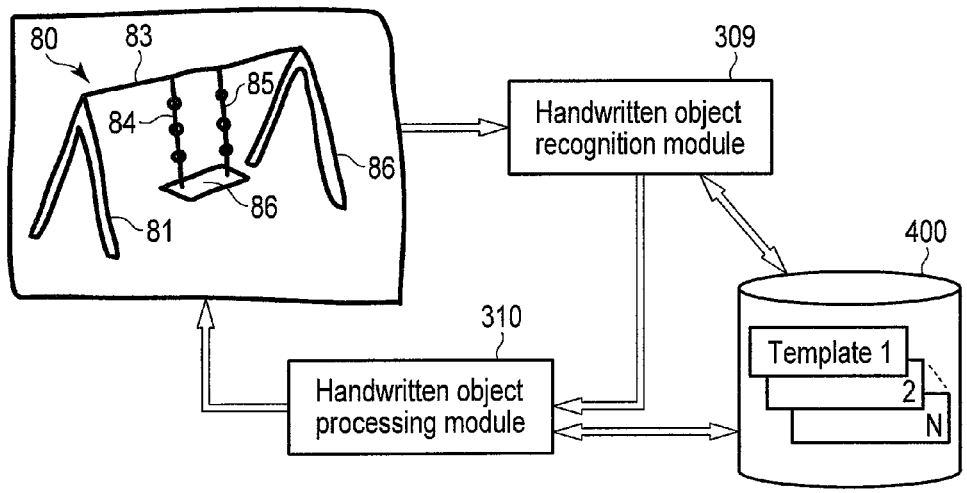
F I G. 1 8
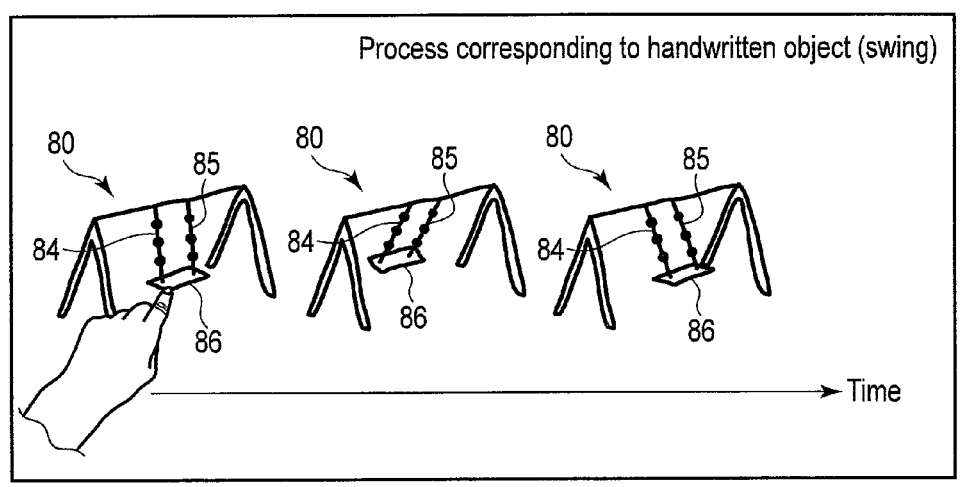
F I G. 1 9

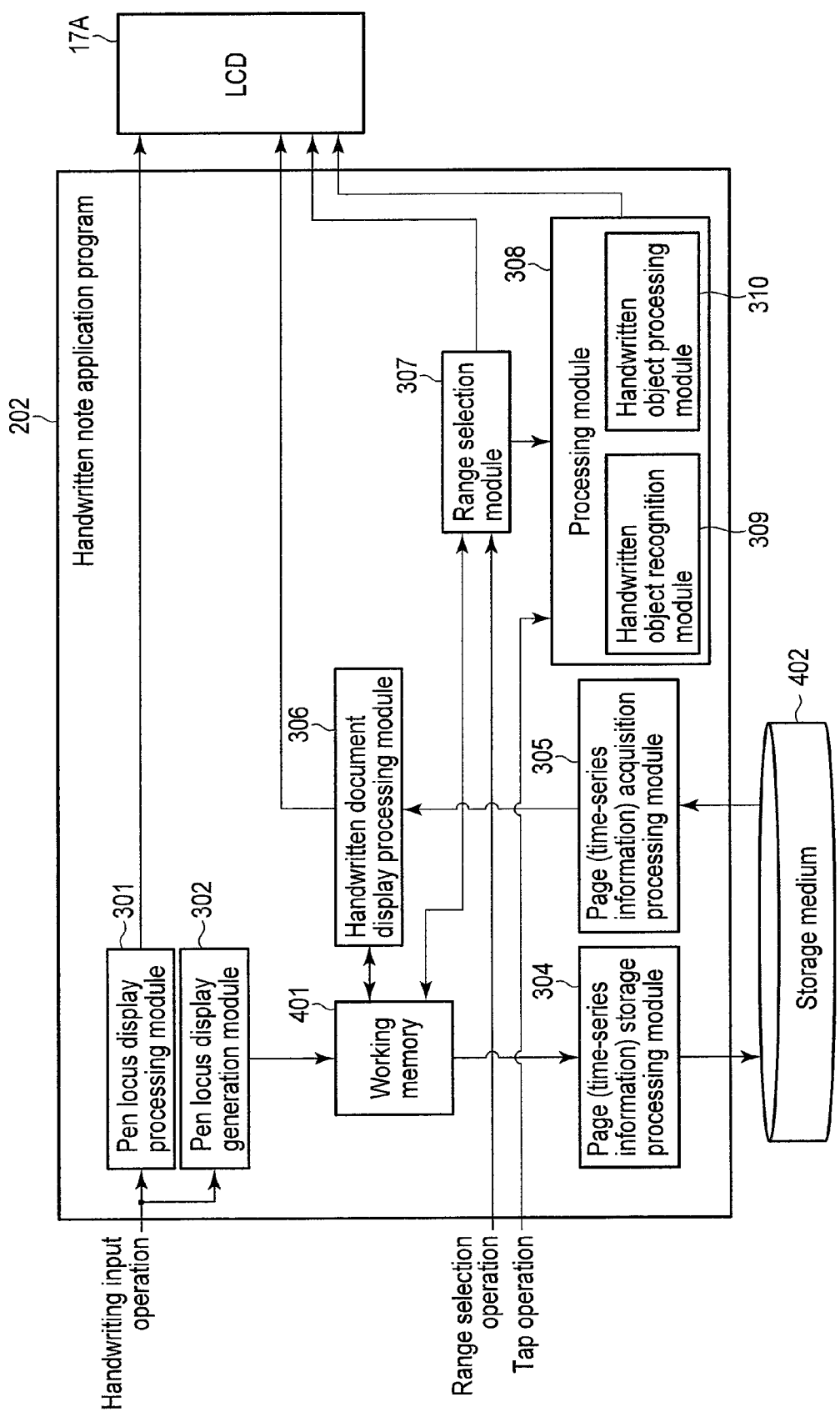
F I G. 20

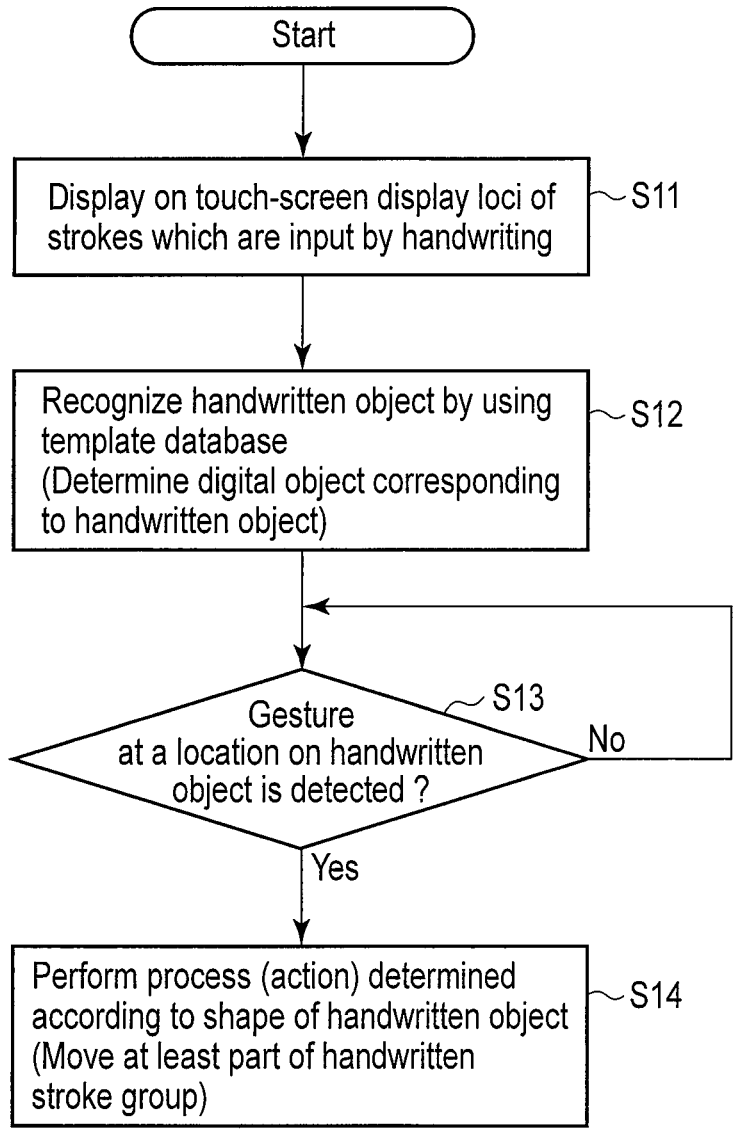
F I G. 2 1

METHOD AND ELECTRONIC DEVICE FOR PROCESSING HANDWRITTEN OBJECT

FIELD

Embodiments described herein relate generally to a technique for handling a handwritten object.

BACKGROUND

In recent years, various electronic devices, including tablets, personal digital assistants (PDAs), smartphones, have been developed. Most of such electronic devices are equipped with a touch-screen display in order to facilitate user's input operations.

A user touches a menu or object displayed on the touch-screen display by a finger or the like, thereby being able to give the electronic device an instruction of performing a function related to the menu or object.

Recently, electronic devices have also been developed, which can input characters to the touch-screen display by handwriting with a pen.

Conventionally, however, handwriting information that has been input by handwriting is merely displayed on the touch-screen display, and equipping this handwriting information with an additional function is not considered.

It is desirable to develop a novel technique of utilizing handwriting information (i.e., handwritten object) efficiently.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary view for explaining time-series information (handwritten information) corresponding to the handwritten document of FIG. 3, the time-series information being stored in a storage medium by the electronic device of the embodiment.

FIG. 12 is an exemplary view for explaining a process of adding a digital object element to the handwritten object of FIG. 6 and a process of substituting an image of a digital object for at least part of the handwritten object of FIG. 6.

FIG. 18 is an exemplary view for explaining still another process of making a handwritten object act as a digital object, which is performed by the electronic device of the embodiment.

FIG. 19 is an exemplary view for explaining a process which is performed in response to the touch of a finger or a pen on the handwritten object of FIG. 18.

FIG. 20 is an exemplary block diagram illustrating a configuration of a handwritten notebook application program which is executed by the electronic device of the embodiment.

FIG. 21 is an exemplary flowchart illustrating a procedure of a handwritten object process which is executed by the electronic device of the embodiment.

DETAILED DESCRIPTION

Various embodiments will be described hereinafter with reference to the accompanying drawings.

In general, according to one embodiment, a method includes: displaying a handwritten object on a touch-screen display of an electronic device, the handwritten object comprising a plurality of strokes, the plurality of strokes being input by handwriting; detecting a touch operation at a location on at least part of the handwritten object on the touch-screen display; and executing a first process determined according to a shape of the handwritten object, if the touch operation is detected.

According to another embodiment, an electronic device includes: a touch-screen display; a display processor configured to display a handwritten object on the touch-screen display, the handwritten object comprising a plurality of strokes, the plurality of strokes being input by handwriting; and an execution module configured to execute a first process determined according to a shape of the handwritten object, if a touch operation at a location on at least part of the handwritten object on the touch-screen display is detected.

Figure 1:
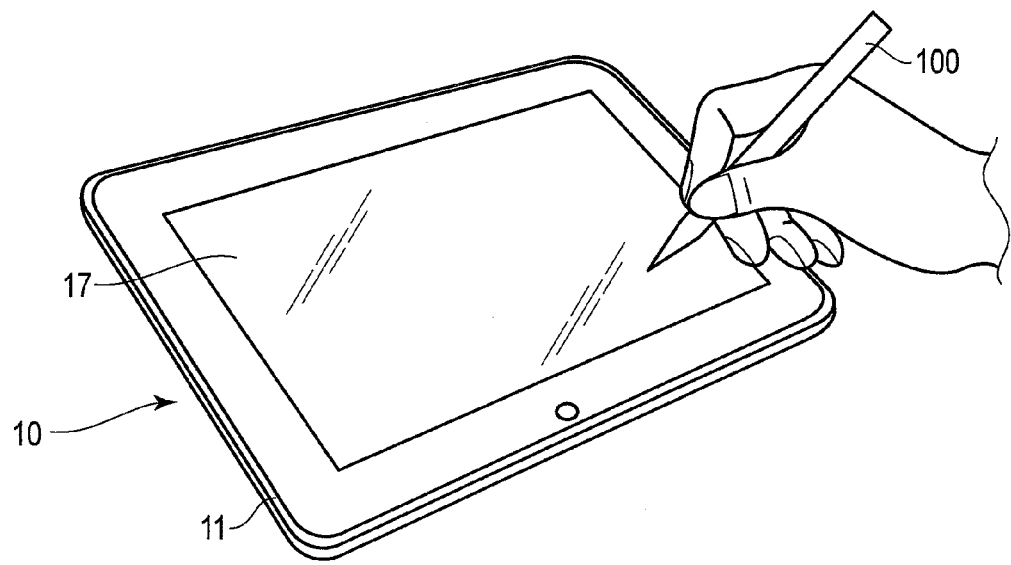
FIG. 1 is an exemplary perspective view illustrating an external appearance of an electronic device according to an embodiment.

FIG. 1 is a perspective view illustrating an external appearance of an electronic device according to an embodiment. The electronic device is, for instance, a pen-based portable electronic device which can execute a handwriting input by a pen or a finger. This electronic device may be implemented using, for example, a tablet computer, a notebook personal computer, a smartphone, and a PDA, etc. Hereinafter, it is assumed that the electronic device is implemented as a tablet computer 10. The tablet computer 10 is a portable electronic device called a tablet or a straight computer, and includes a main body 11 and a touch-screen display 17, as illustrated in FIG. 1. The touch-screen display 17 is mounted on the upper surface of the main body 11 so as to be overlaid thereupon.

The main body 11 has a thin box-shaped casing. In the touch-screen display 17, a flat-panel display and a sensor, which is configured to detect a touch position of a pen or a finger on the screen of the flat-panel display, are assembled. The flat panel display may be, for example, a liquid crystal display (LCD). For the sensor, for example, an electrostatic capacitance-type touch panel or an electromagnetic induction type digitizer may be used. Hereinafter, it is assumed that two kinds of sensors, namely a digitizer and a touch panel, are both assembled in the touch-screen display 17.

The touch-screen display 17 can detect not only a touch operation on the screen with use of a finger, but also a touch operation on the screen with use of a pen 100. The pen 100 may be, for example, a digitizer pen (e.g. an electromagnetic induction type pen).

A user can perform a handwriting input operation on the touch-screen display 17 by using the pen 100. During the handwriting input operation, a locus of movement of the pen 100 on the screen, that is, a locus (a locus of handwritten stroke) of a stroke which is handwritten by a handwriting input operation, is drawn in real time. As a result, plural strokes that have been input by handwriting are displayed on the screen. A locus of movement of the pen 100 during a time in which the pen 100 is in contact with the screen corresponds to one stroke. A set of many strokes corresponding to a handwritten character, a handwritten figure, a handwritten table and the like, constitute a handwritten document.

In this embodiment, the handwritten document is stored in the storage medium, as not image data but time-series information (handwritten document data) that indicates coordinate series of the loci of strokes and the order relation between the strokes. Although the details of this time-series information will be described later with reference to FIG. 4, this time-series information indicates an order in which a plurality of strokes are handwritten, and includes a plurality of stroke data corresponding to a plurality of strokes. In other words, the time-series information means a set of time-series stroke data corresponding to a plurality of strokes. Each stroke data corresponds to one stroke, and includes coordinate data series (time-series coordinates) corresponding to points on the locus of this stroke. The order of arrangement of these stroke data corresponds to an order in which strokes are handwritten.

The tablet computer 10 can read arbitrary existing time-series information from the storage medium, and display, on the screen, a handwritten document corresponding to this time-series information, namely, plural strokes indicated by the time-series information. Here, the plural strokes indicated by the time-series information also are strokes that have been input by handwriting.

In this embodiment, the tablet computer 10 also has a touch input mode that permits a handwriting input operation using a finger instead of the pen 100. While the touch input mode is effective, the user can perform a handwriting input operation on the touch-screen display 17 by using the finger. During this handwriting input operation, a locus of movement of the finger on the screen, that is, a locus (a locus of handwritten stroke) of a stroke which is handwritten by the handwriting input operation, is drawn in real-time. As a result, plural strokes that have been input by handwriting are displayed on the screen.

Further, the tablet computer 10 has a handwritten object processing function which equips a handwritten object with a function equivalent to a digital object such as a gadget. The handwritten object is handwriting information such as a handwritten figure. This handwritten object processing function performs a process determined according to a shape of a handwritten object (i.e., a shape of handwriting of handwritten strokes), in response to the detection of a touch operation (e.g. tapping gesture) on a part of the handwritten object (e.g. a part of handwriting of plural handwritten strokes contained in the handwritten object). The touch operation is performed by using the pen 100 or the finger.

For example, if it is determined that a digital object corresponding to the shape of the handwritten object is a clock object (clock gadget), the handwritten object processing function may perform a process associated with the clock object.

The process associated with the clock object may include a process of making the handwritten object act as the clock object. For example, the process associated with the clock object may include a process of moving the loci of one or more handwritten strokes in the handwritten object (handwritten clock) which correspond to a hand of a clock, for example, in accordance with a system clock.

As a result, the handwritten clock can be utilized instead of the clock object (clock gadget). This handwritten clock may be displayed on a desktop screen or other arbitrary screen.

In this embodiment, the handwritten document may be managed as one page or plural pages. In this case, the time-series information (handwritten document data) may be divided in units of an area which falls within one screen, and thereby a piece of time-series information, which falls within one screen, may be stored as one page. Alternatively, the size of one page may be made variable. In this case, since the size of a page can be increased to an area which is larger than the size of one screen, a handwritten document of an area larger than the size of the screen can be handled as one page. When one whole page cannot be displayed on the display at a time, this page may be reduced in size and displayed, or a display target part in the page may be moved by vertical and horizontal scroll.

Figure 2:
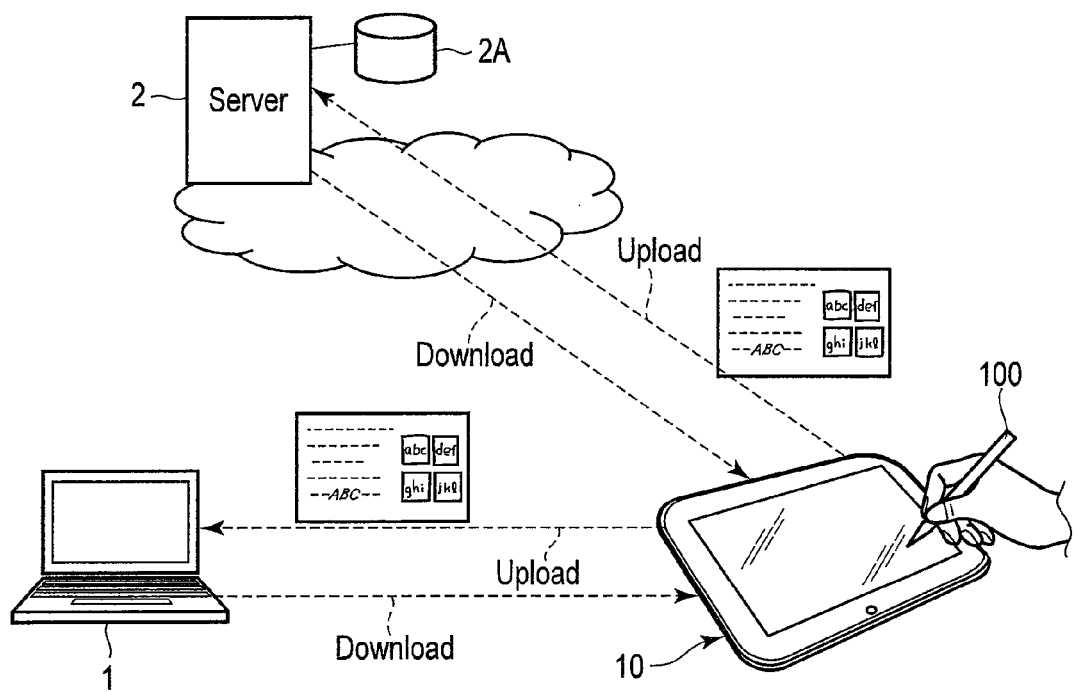
FIG. 2 is an exemplary view illustrating a cooperative operation between the electronic device of the embodiment and an external apparatus.

FIG. 2 shows an example of a cooperative operation between the tablet computer 10 and an external apparatus. The tablet computer 10 can cooperate with a personal computer 1 or a cloud. Specifically, the tablet computer 10 is provided with a wireless communication device such as a wireless LAN, and can conduct wireless communications with the personal computer 1. In addition, the tablet computer 10 can also communicate with a server 2 on the Internet. The server 2 may be a server that performs an online storage service or other various cloud computing services.

The personal computer 1 is provided with a storage device such as a hard disk drive (HDD). The tablet computer 10 can transmit the time-series information (handwritten document data) to the personal computer 1 over a network, and store it on the HDD of the personal computer 1 (upload). Because of this operation, even when the capacity of the storage in the tablet computer 10 is small, the tablet computer 10 can handle many pieces of or large volumes of time-series information.

The tablet computer 10 can read out ("download") one or more arbitrary time-series information stored in the HDD of the personal computer 1, and can display the locus of each stroke indicated by the read-out time-series information on the screen of the display 17 of the tablet computer 10. In this case, a list of thumbnails, which are obtained by reducing in size the pages of the plural pieces of time-series information, may be displayed on screen of the display 17, or one page which is selected from these thumbnails may be displayed on the screen in the normal size.

Furthermore, the destination of communication of the tablet computer 10 may be not the personal computer 1, but the server 2 on the cloud which provides storage services, etc., as described above. The tablet computer 10 can transmit time-series information (handwritten document data) to the server 2 over the network, and can store it in a storage device 2A of the server 2 ("upload"). Besides, the tablet computer 10 can read out arbitrary time-series information which is stored in the storage device 2A of the server 2 ("download") and can display the locus of each stroke indicated by the time-series information on the screen of the display 17 of the tablet computer 10.

As has been described above, in the present embodiment, the storage medium in which the time-series information is stored may be the storage device in the tablet computer 10, the storage device in the personal computer 1, or the storage device in the server 2.

Figure 3:
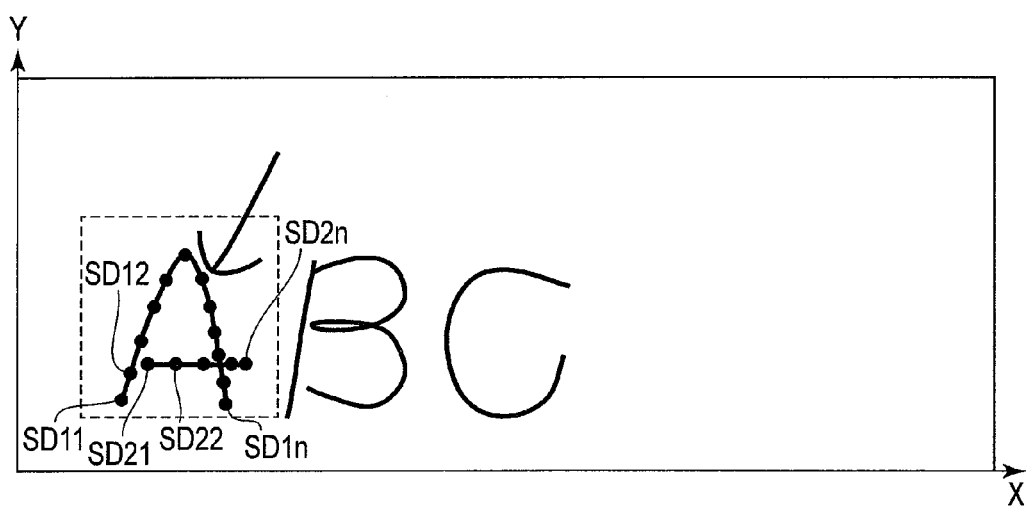
FIG. 3 is a view illustrating an example of a handwritten document which is handwritten on a touch-screen display of the electronic device of the embodiment.

Next, a description will be given of a relationship between the time-series information and the strokes (character, figure, table, etc.) which are handwritten by a user, with reference to FIGS. 3 and 4. FIG. 3 illustrates an example of a handwritten document (handwritten character string) that has been handwritten on the touch-screen display 17 with the pen 100 or the like.

In many cases, on a handwritten document, other characters or figures are handwritten over already handwritten characters or figures. In FIG. 3, the case is assumed that a handwritten character string "ABC" was handwritten in the order of "A", "B" and "C", and thereafter a handwritten arrow was handwritten near the handwritten character "A".

The handwritten character "A" is expressed by two strokes (a locus of "∧" shape, a locus of "-" shape) which are handwritten by using the pen 100 or the like, that is, by two loci. The locus of the pen 100 of the first handwritten "∧" shape is sampled in real time, for example, at regular time intervals, and thereby time-series coordinates SD11, SD12, . . . , SD1n of the stroke of the "∧" shape are obtained. Similarly, the locus of the pen 100 of the next handwritten "-" shape is sampled in real time at regular time intervals, and thereby time-series coordinates SD21, SD22, . . . , SD2n of the stroke of the "-" shape are obtained.

The handwritten character "B" is expressed by two strokes which are handwritten by using the pen 100 or the like, that is, by two loci. The handwritten character "C" is expressed by one stroke which is handwritten by using the pen 100 or the like, that is, by one locus. The handwritten "arrow" is expressed by two strokes which are handwritten by using the pen 100 or the like, that is, by two loci.

FIG. 4 illustrates time-series information 200 corresponding to the handwritten document of FIG. 3. The time-series information 200 includes a plurality of stroke data SD1, SD2, . . . , SD7. In the time-series information 200, these stroke data SD1, SD2, . . . , SD7 are arranged in time series in the order in which these strokes are handwritten.

In the time-series information 200, the first two stroke data SD1 and SD2 are indicative of two strokes of the handwritten character "A". The third and fourth stroke data SD3 and SD4 are indicative of two strokes which constitute the handwritten character "B". The fifth stroke data SD5 is indicative of one stroke which constitutes the handwritten character "C". The sixth and seventh stroke data SD6 and SD7 are indicative of two strokes which constitute the handwritten "arrow".

Each stroke data includes coordinate data series (time-series coordinates) corresponding to one stroke, that is, a plurality of coordinates corresponding to a plurality of points on the locus of one stroke. In each stroke data, the plural coordinates are arranged in time series in the order in which the stroke is written. For example, as regards handwritten character "A", the stroke data SD1 includes coordinate data series (time-series coordinates) corresponding to the points on the locus of the stroke of the "∧" shape of the handwritten character "A", that is, an n-number of coordinate data SD11, SD12, . . . , SD1n. The stroke data SD2 includes coordinate data series corresponding to the points on the locus of the stroke of the "-" shape of the handwritten character "A", that is, an n-number of coordinate data SD21, SD22, . . . , SD2n. Incidentally, the number of coordinate data may differ between respective stroke data.

Each coordinate data is indicative of an X coordinate and a Y coordinate, which correspond to one point in the associated locus. For example, the coordinate data SD11 is indicative of an X coordinate (X11) and a Y coordinate (Y11) of the starting point of the stroke of the "∧" shape. The coordinate data SD1n is indicative of an X coordinate (X1n) and a Y coordinate (Y1n) of the end point of the stroke of the "∧" shape.

Further, each coordinate data may include time stamp information T corresponding to a time point at which a point corresponding to this coordinate data was handwritten. The time point at which the point was handwritten may be either an absolute time (e.g. year/month/date/hour/minute/second) or a relative time with reference to a certain time point. For example, an absolute time (e.g. year/month/date/hour/minute/second) at which a stroke began to be handwritten may be added as time stamp information to each stroke data, and furthermore a relative time indicative of a difference from the absolute time may be added as time stamp information T to each coordinate data in the stroke data.

In this manner, by using the time-series information in which the time stamp information T is added to each coordinate data, the temporal relationship between strokes can be more precisely expressed.

Moreover, information (Z) indicative of a pen stroke pressure may be added to each coordinate data.

In this embodiment, as described above, the handwritten document data is stored, as not an image or a result of character recognition but the time-series information 200 configured of a set of pieces of time-series stroke data. Accordingly, handwritten characters can be handled, without depending on languages of the handwritten characters. Thus, the structure of the time-series information 200 in this embodiment can be commonly used among various countries with different languages.

Figure 5:
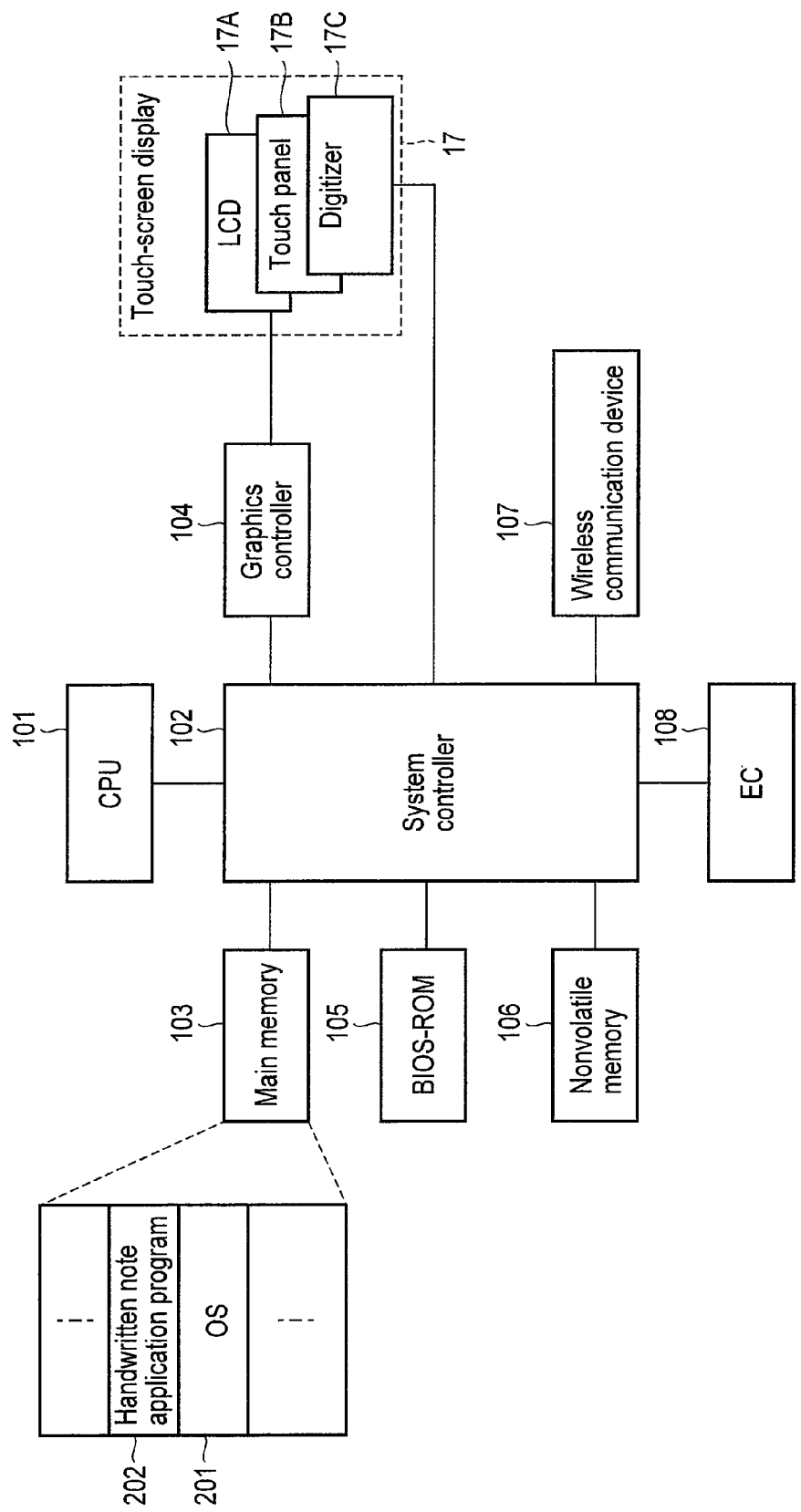
FIG. 5 is an exemplary block diagram illustrating a system configuration of the electronic device of the embodiment.

FIG. 5 illustrates a system configuration of the tablet computer 10.

As illustrated in FIG. 5, the tablet computer 10 includes a CPU 101, a system controller 102, a main memory 103, a graphics controller 104, a BIOS-ROM 105, a nonvolatile memory 106, a wireless communication device 107, an embedded controller (EC) 108, and the like.

The CPU 101 is a processor that controls operations of various modules in the tablet computer 10. The CPU 101 executes various types of software, which are loaded from the nonvolatile memory 106 that is a storage device into the main memory 103. These types of software include an operating system (OS) 201 and various application programs. The application programs include a handwritten note application program 202. The handwritten note application program 202 has a function of creating and displaying the above handwritten document data, a function of editing the handwritten document data, and a handwritten document search function of searching for handwritten document data containing a desired handwritten portion, or searching for a desired handwritten portion in certain handwritten document data. Furthermore, the handwritten note application program 202 has the above handwritten object processing function of making a handwritten object such as a handwritten figure act as a digital object (gadget).

The CPU 101 also executes a basic input output system (BIOS) stored in the BIOS-ROM 105. The BIOS is a program for hardware control.

The system controller 102 is a device that connects between a local bus of the CPU 101 and each component. The system controller 102 also includes a built-in memory controller that controls access to the main memory 103. In addition, the system controller 102 also has a function of communicating with the graphic controller 104, for example, via a serial bus of the PCI EXPRESS standard.

The graphic controller 104 is a display controller that controls an LCD 17A to be used as a display monitor of the tablet computer 10. A display signal, which is generated by the graphics controller 104, is sent to the LCD 17A. The LCD 17A displays a screen image in accordance with the display signal. A touch panel 17B, the LCD 17A and a digitizer 17C are overlaid on one another. The touch panel 17B is an electrostatic capacitance-type pointing device for executing an input on the screen of the LCD 17A. A contact position on the screen, which is touched by a finger, and a movement of the contact position are detected by the touch panel 17B. The digitizer 17C is an electromagnetic induction-type pointing device for executing an input on the screen of the LCD 17A. A contact position on the screen, which is touched by the pen (digitizer pen) 100, and a movement of the contact position are detected by the digitizer 17C.

The wireless communication device 107 is a device that conducts wireless communications such as wireless LAN or 3G mobile communication. The EC 108 is a one-chip microcomputer including an embedded controller for power management. The EC 108 has a function of powering on or off the tablet computer 10 in response to a user's operation of a power button.

Figure 6:
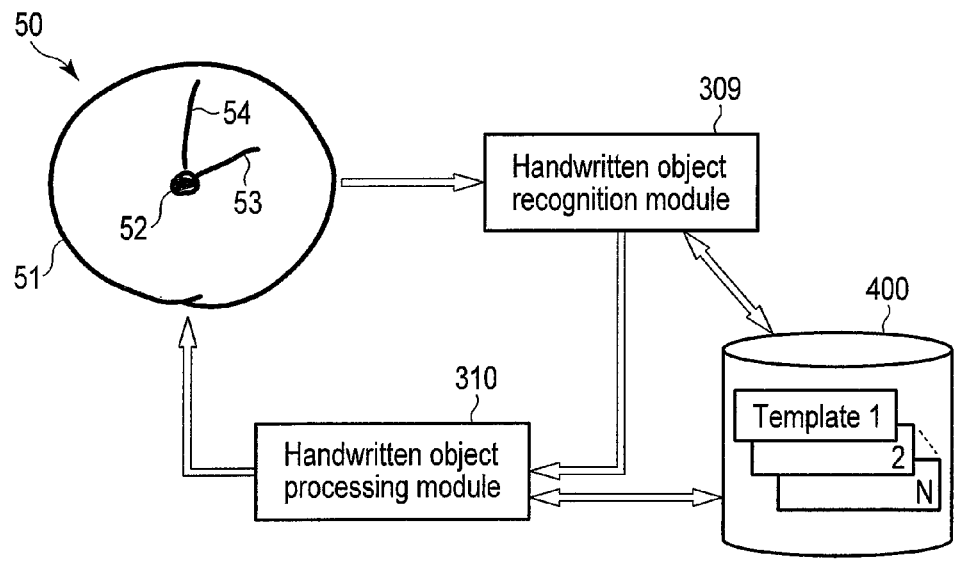
FIG. 6 is an exemplary view for explaining a process of making a handwritten object act as a digital object, which is performed by the electronic device of the embodiment.

FIG. 6 illustrates an exemplary process of making a handwritten object act as a digital object. As described above, loci of plural strokes (handwritten strokes) which are input by handwriting are displayed on the touch-screen display 17 as handwriting information. The user can select an arbitrary handwritten stroke group, for example, by using a range selection tool. In addition, the user can activate a handwritten object recognition process, for example, by operating a graphical user interface (GUI) (e.g. button) for performing the handwriting recognition processing function. This handwritten object recognition process is a process of determining a digital object corresponding to a handwritten object, based on a shape of this handwritten object. The handwritten object recognition process determines to which of preset digital objects the handwritten stroke group (selected handwritten object) selected by the range selection corresponds. The user handwrites an illustration on the touch-screen display 17, and then operates the GUI for performing the handwriting recognition processing function. As a result, this handwritten illustration (handwritten object) can be utilized as a certain digital object (gadget). In FIG. 6, it is assumed that the user handwrites a handwritten object 50 on the touch-screen display 17 by using the pen 100.

The handwritten object 50 includes loci of plural handwritten strokes. In more detail, the handwritten object 50 includes a handwritten portion 51 corresponding to an outer frame, a handwritten portion 52 corresponding to a central portion, and two handwritten portions 53 and 54 corresponding to two line segments, respectively. Each of these handwritten portions includes one or more handwritten strokes.

A handwritten object recognition module 309 performs the above handwritten object recognition process, in response to the operation of the GUI which is performed by the user. The handwritten object recognition module 309 recognizes a feature of each element (each handwritten portion) in the handwritten object 50, such as "round," "angular," "extending," or "frame-shaped". Then, the handwritten object recognition module 309 determines a digital object corresponding to a shape of the handwritten object 50, based on a combination of the featured portions in the handwritten object 50. In this case, the handwritten object recognition module 309 can determine the digital object corresponding to the shape of the handwritten object 50 by using a template database 400.

In the template database 400, plural pieces of template information which correspond to plural digital objects are stored. Each piece of template information includes feature information that indicates several featured portions of a certain digital object, and process definition information that indicates a process (action) associated with this digital object, and the like. The handwritten object recognition module 309 identifies a template having a combination of featured portions which matches a combination of featured portions of the handwritten object 50, based on the combination of featured portions of the handwritten object 50. Then, the handwritten object recognition module 309 determines that a digital object corresponding to this identified template is to be a digital object corresponding to the shape of the handwritten object 50.

In the handwritten object recognition process of this embodiment, as described above, the digital object corresponding to the shape of the handwritten object is determined by matching between several featured portions of the handwritten object and several featured portions of a certain digital object, not matching between image feature amounts thereof. This handwritten object recognition technique eliminates the need for the user to handwrite a precise shape of a digital object. The handwritten object recognition technique enables the handwritten information (a handwritten object) to be recognized as the desired digital object, even when the user handwrites only some of featured portions of a desired digital object.

The handwritten object processing module 310 detects a touch operation at a location on at least part of the handwritten object 50. Then, the handwritten object processing module 310 performs a process determined according to the shape of the handwritten object 50, in response to detecting the touch operation at the location on at least the part of the handwritten object 50. This touch operation may be a gesture, such as tap gesture and long tap gesture, applied to at the location on at least the part of the handwritten object 50 with the finger or pen 100. The process determined according to the shape of the handwritten object 50 may include a process of making the handwritten object 50 act as the digital object corresponding to the handwritten object 50, which has been determined in the above manner.

For example, it is assumed that the handwritten object 50 has been recognized as a clock object (clock gadget). The handwritten object processing module 310 executes a process (action) indicated by the process definition information contained in the template information which corresponds to the clock gadget. This process may include a process of moving at least part of the handwritten object 50. A manner, in which at least the part of the handwritten object 50 moves, is determined according to a shape of the handwritten object 50. For example, a process of moving locos of a certain stroke contained in the handwritten object 50 which correspond to a hand of the clock may be executed.

Figure 7:
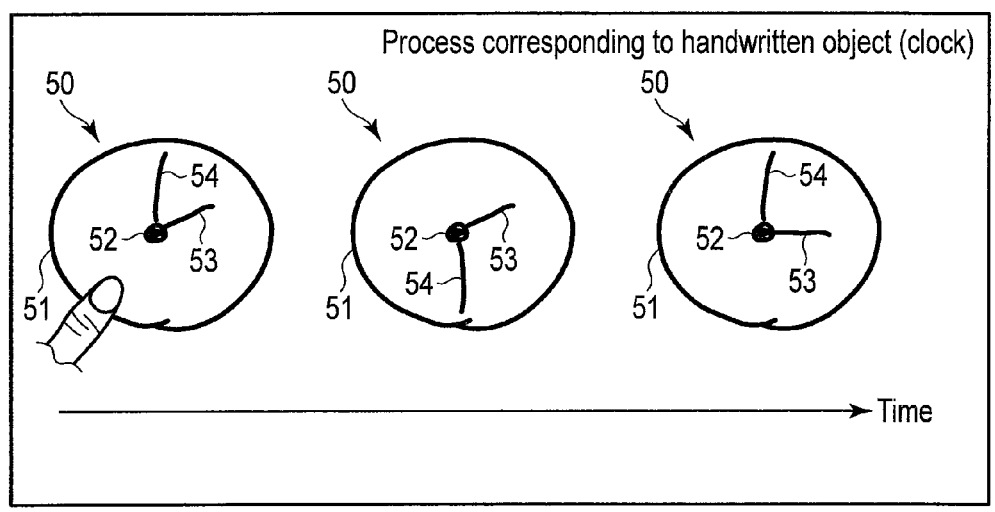
FIG. 7 is an exemplary view for explaining a process which is performed in response to the touch of a finger or a pen on the handwritten object illustrated in FIG. 6.

FIG. 7 illustrates a process of moving the locus of a certain stroke in the handwritten object (handwritten clock) 50.

The handwritten object processing module 310 can move loci of the strokes 53 and 54 in the handwritten object 50, based on a present time, so that the locus of the stroke 53 corresponding to the short hand of a clock and the locus of the stroke 54 corresponding to the long hand of the clock are moved respectively to locations corresponding to the present time. In this case, the locus of the stroke 54 is rotated clockwise about the handwritten portion 52. The locus of the stroke 54 is rotated at a speed to make a revolution in an hour. Meanwhile, the locus of the stroke 53 is rotated clockwise about the handwritten portion 52 at a speed to make a revolution in 12 hours.

As illustrated in the left part of FIG. 7, upon detecting a finger tap gesture, etc, at a location on a part of the handwritten object 50, the handwritten object processing module 310 starts the process of moving the loci of the strokes 53 and 54. For example, if a present time is 2:30, the handwritten object processing module 310 moves the respective loci of the strokes 53 and 54 such that the respective loci of the strokes 53 and 54 are set at the corresponding locations illustrated in the central part of FIG. 7. Subsequently, the handwritten object processing module 310 moves the respective loci of the strokes 53 and 54, based on the present time (e.g. a clock module (real-time clock) in the tablet computer 10). The right part of FIG. 7 illustrates respective locations of loci of the stroke 53 and 54 when the present time is 3:00.

The user can advance or delay the time indicated by the handwritten object (handwritten clock) 50, by touching the stroke 53 or 54 with the pen 100 or the finger. In addition, the user can also fold back the outer end of the stroke 53 or 54 by touching the outer end with the finger. Moreover, the user may increase the size (area) of the handwritten object (handwritten clock) 50 by performing an operation such as stretching one end and another end of the handwritten object (handwritten clock) 50 with the fingers (pinching out gesture). Likewise, the user may decrease the size (area) of the handwritten object (handwritten clock) 50 by performing an operation such as stretching one end and another end of the handwritten object (handwritten clock) 50 with the fingers (pinching in gesture).

Figure 8:
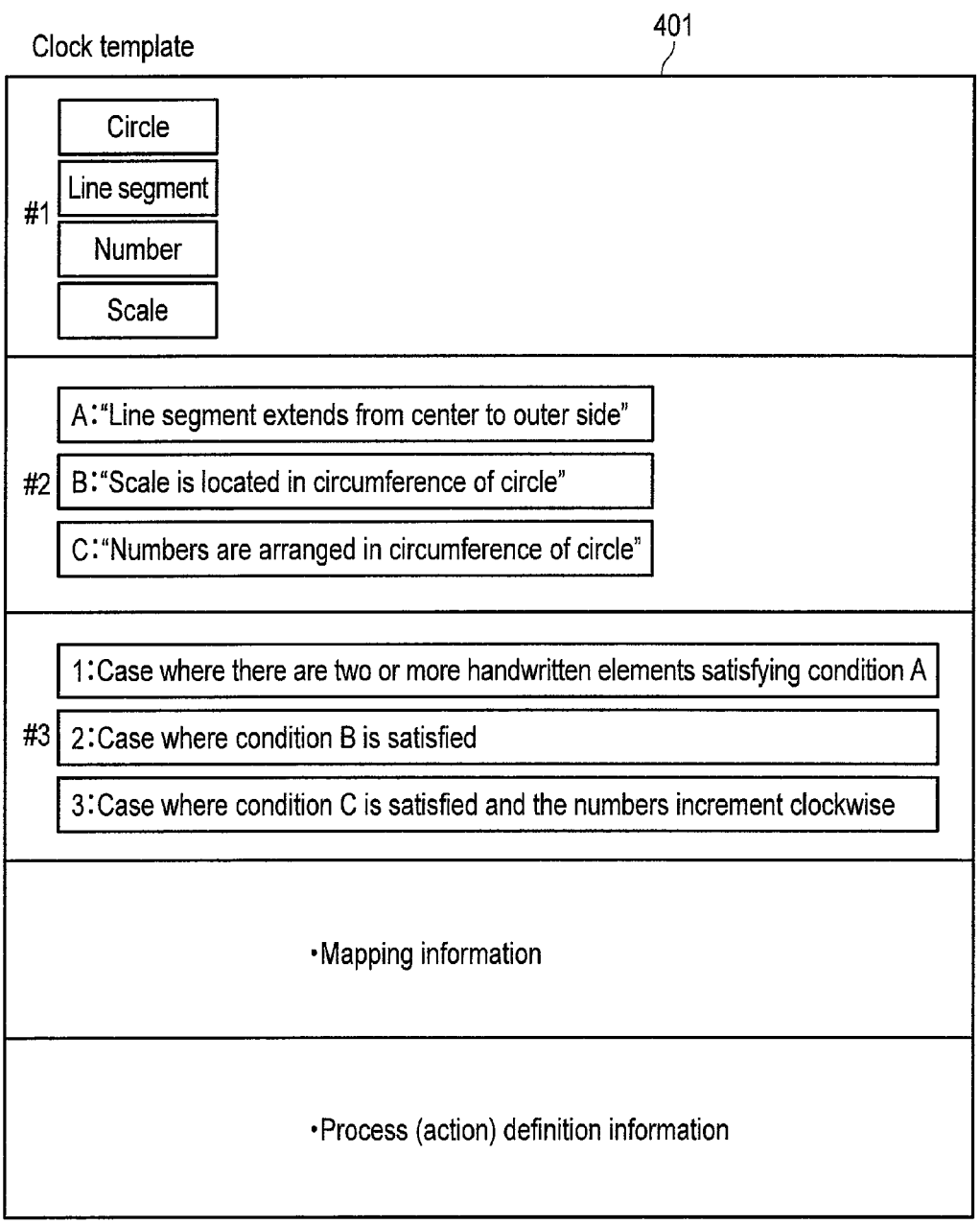
FIG. 8 is a view explaining an example of template used by the electronic device of the embodiment, in order to determine a digital object corresponding to a handwritten object.

FIG. 8 illustrates exemplary clock template information 401 corresponding to the clock gadget.

The clock template information 401 is template information used to recognize a handwritten object as a clock gadget. The clock gadget is a digital object corresponding to a clock.

The clock template information 401 includes first information #1, second information #2, and third information #3, as information used to determine whether or not a shape of a handwritten object corresponds to a clock. The first information #1 indicates some typical elements constituting a clock. Examples of the typical elements include a circle (outer shape), a line segment, a number, and a scale.

The second information #2 is information that defines a positional relationship between the elements. Examples of the information that defines a positional relationship between the elements include conditions A, B and C that "a line segment extends from a center of a circle to an outer side thereof," "a scale is located in a circumference of a circle," and "numbers are arranged in a circumference of a circle," respectively.

The third information #3 is information used to finally determine whether or not a shape of a handwritten object corresponds to a clock. Examples of the third information #3 include conditions that "a case where there are two elements satisfying the condition A of the second information," "a case where the condition B of the second information is satisfied," and "a case where the condition C of the second information is satisfied and the numbers increment clockwise." When one of the conditions of the third information #3 is satisfied, it is determined that a digital object corresponding to a shape of a handwritten object is a clock object (clock gadget).

The clock template information 401 further includes mapping information and process (action) definition information. The mapping information is information indicating which of featured portions (elements) of a handwritten object corresponds to what featured portion (element) of a clock gadget. The process (action) definition information is information indicating content of process (action) to be performed in response to detecting a touch operation on a handwritten object which has been determined to be a clock gadget. The process (action) definition information includes information used to direct a line element corresponding to a short hand to move at a first speed (a revolution in 12 hours), information used to direct a line element corresponding to a long hand to move at a second speed (a revolution per hour), and information used to direct a line element corresponding to a second hand to move at a third speed (a revolution per minute).

Note that the clock template in FIG. 8 corresponds to a circular clock, but a template corresponding to a quadrilateral clock may be prepared.

Figure 9:
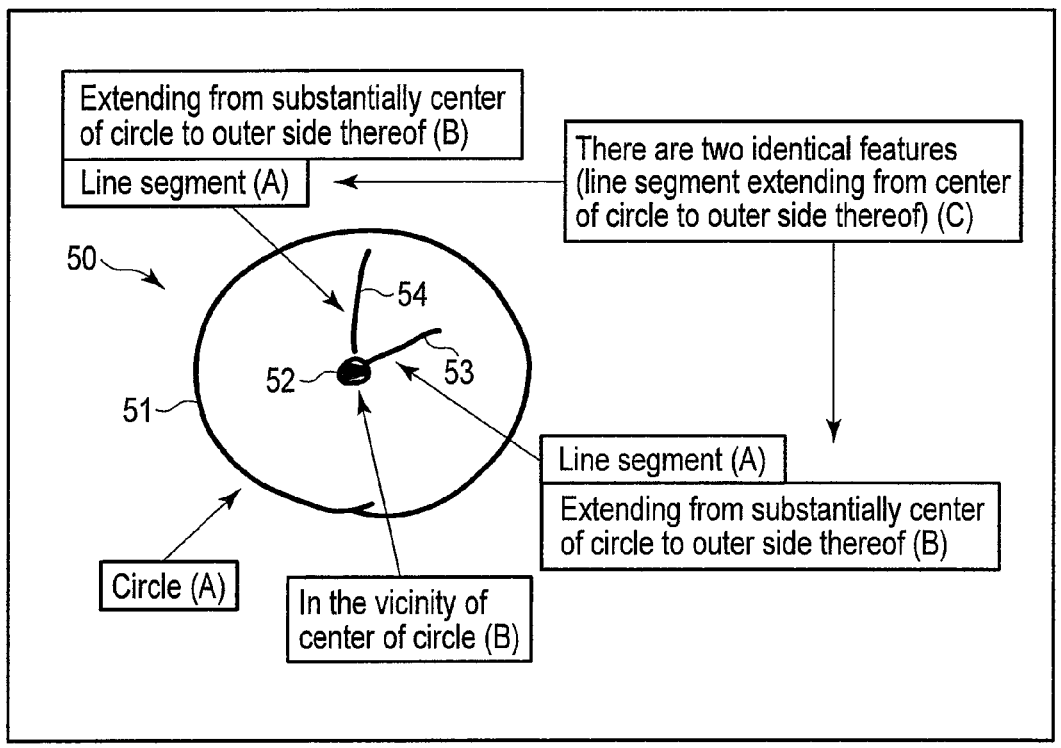
FIG. 9 is an exemplary view for explaining a process of analyzing individual features of a plurality of elements of the handwritten object of FIG. 6.

FIG. 9 illustrates a process of analyzing respective features of plural elements in the handwritten object 50 illustrated in FIG. 6.

The handwritten object recognition module 309 analyzes respective features of plural (handwritten) elements in the handwritten object 50 by using the clock template information 401, thereby determining some typical featured portions of the handwritten object 50. First, in a first analysis, the handwritten object recognition module 309 acquires information (A) illustrated in FIG. 9. Specifically, the handwritten object recognition module 309 determines whether each of the handwritten portions (elements) is a circle, a line segment, or the like.

Then, in a second analysis, the handwritten object recognition module 309 acquires information (B) illustrated in FIG. 9. The information (B) illustrated in FIG. 9 mainly indicates a positional feature of each handwritten element (figure) which is based on a positional relationship between the handwritten elements (figures). In the second analysis, the feature information is acquired which indicates, for example, "the handwritten portion 52 is present close to the center of the handwritten portion 51 that is a circle", "the handwritten portion 53 which is a line segment extends from substantially the center of the circle to the outer side thereof", "the handwritten portion 54 which is a line segment extends from substantially the center of the circle to the outer side thereof" and the like.

Furthermore, in a third analysis, the handwritten object recognition module 309 acquires information (C) illustrated in FIG. 9. Specifically, the handwritten object recognition module 309 recognizes that the handwritten object 50 includes two elements (handwritten portions 53 and 54) that extend from substantially the center of the circle to the outer side thereof. As a result, the handwritten object recognition module 309 determines that a shape of the handwritten object 50 is a digital object of a clock.

Figures 10, 11:
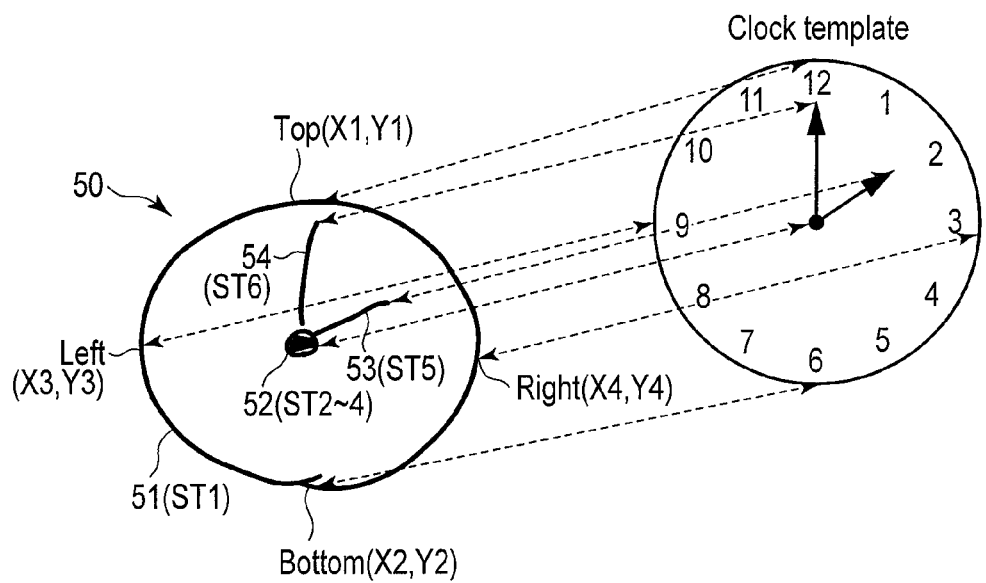
FIG. 10 is an exemplary view for explaining a process of relating the feature points of the handwritten object of FIG. 6 to elements of a clock template.
FIG. 11 is an exemplary view for explaining a relationship between some handwritten elements of the handwritten object of FIG. 6 and some elements of a digital object.

FIG. 10 illustrates a process of relating the feature points of the handwritten object 50 to the elements of the clock template. FIG. 11 illustrates the exemplary mapping information in the clock template information 401 of FIG. 8.

In both FIGS. 10 and 11, it is assumed that the handwritten portion 51 contains one handwritten stroke ST1, the handwritten portion 52 contains three handwritten strokes ST2, ST3 and ST4, the handwritten portion 53 contains one handwritten stroke ST5, and the handwritten portion 54 contains one handwritten stroke ST6. The handwritten object recognition module 309 relates each element (at least a stroke) of the handwritten object 50 to any one of plural object elements which form a figure of the clock template, based on the above analysis results. Examples of the plural object elements include "outer frame", "long hand", "short hand", "second hand", "central point", and "top, bottom, left and right" as illustrated in FIG. 11. Here, the "top, bottom, left and right" represents the upper, lower, left and right ends of the outer frame, respectively. As a result of the analysis conducted by the handwritten object recognition module 309, it is determined that the handwritten stroke ST1 correspond to the "outer frame", the handwritten stroke ST6 correspond to the "long hand", and the handwritten stroke ST5 correspond to the "short hand". In addition, it is determined that the handwritten strokes ST2, ST3 and ST4 correspond to the central point. Moreover, it is determined that coordinate (X1, Y1) on the handwritten stroke ST1 corresponds to the "upper end", coordinate (X2, Y2) on the handwritten stroke ST1 corresponds to the "lower end", coordinate (X3, Y3) on the handwritten stroke ST1 corresponds to the "left end", and coordinate (X4, Y4) on the handwritten stroke ST1 corresponds to the "right end".

FIG. 12 illustrates a process of adding digital object elements to the handwritten object 50 and a process of substituting an image of a digital object for at least part of the handwritten object 50.

In this embodiment, the handwritten object recognition module 309 may add digital object elements, such as numbers 1 to 12, to the handwritten object 50 by using the above mapping information, in order to make the handwritten object 50 look more like a clock. In this case, the above coordinates ((X1, Y1), (X2, Y2), (X3, Y3), (X4, Y4)) that correspond to the upper, lower, left and right ends of the outer frame, respectively, may be used as reference locations at which twelve fonts (texts) corresponding to numbers 1 to 12 are to be arranged along a circumference (stroke ST1).

Moreover, the handwritten object recognition module 309 may substitute an image of a digital object for at least part of the handwritten object 50 by using the above mapping information, in order to make the handwritten object 50 look more like a clock. FIG. 12 illustrates an exemplary image 50' at the lower left thereof, in which all the elements of the handwritten object 50 are changed to images of digital objects, and images of digital objects corresponding to a scale, numbers and a casing are added.

Although the example having been described with reference to FIGS. 6 to 12 in which the handwritten object acts as a display digital object such as a clock gadget, the handwritten object may also act as a digital object for inputting a command or data to the tablet computer 10.

Figure 13:
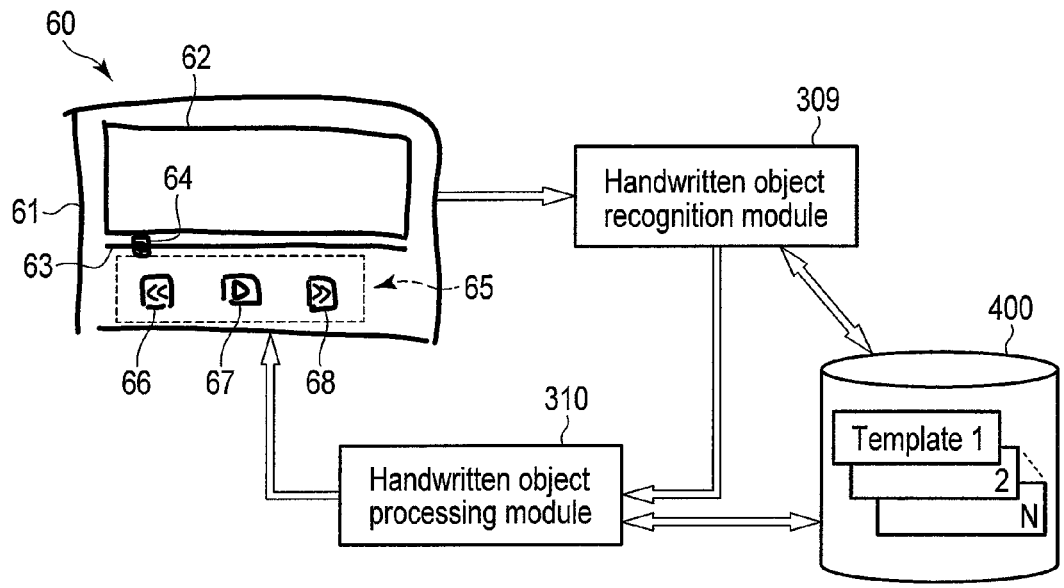
FIG. 13 is an exemplary view for explaining another process of making a handwritten object act as a digital object, which is performed by the electronic device of the embodiment.

FIG. 13 illustrates an example in which the handwritten object acts as a software player such as a music player or a video player.

The handwritten object 60 of FIG. 13 includes loci of plural handwritten strokes. In more detail, the handwritten object 60 includes a handwritten portion 61 corresponding to a substantially quadrangular shaped outer frame, a handwritten portion 62 corresponding to a substantially quadrangular shaped inner frame, a handwritten portion 63 corresponding to a laterally extending line segment, a handwritten portion 64 having the shape of a slider (knob), and three handwritten portions 66, 67 and 68 corresponds to three inner frames each having the shape of a substantially quadrangular.

Each of these handwritten portions includes one or more handwritten strokes. Each of the handwritten portions 66, 67 and 68 further includes a handwritten figure within the substantially quadrangular frame.

The above template database 400 includes a template of a digital object corresponding to a software player (player template). The handwritten object recognition module 309 can determine that a shape of the handwritten object 60 is a player object, by matching between the player template and the handwritten object 60. In this case, the handwritten object recognition module 309 first recognizes that the substantially quadrangular frames of the three handwritten portions 66, 67 and 68 in the handwritten portion 65 are arranged at the same vertical location. Then, the handwritten object recognition module 309 can recognize that the three handwritten portions 66, 67 and 68 are three buttons for controlling the play back of media data (videos, sill images, audio, etc), based on shapes of handwritten figures within the three handwritten portions 66, 67 and 68. Specifically, the handwritten object recognition module 309 may recognize the handwritten portions 66, 67 and 68 as "back" button, "play" button, and "next" button, respectively. In addition, the handwritten object recognition module 309 may recognize the handwritten portion 62 as a content display area.

For example, the handwritten object processing module 310 may perform a function associated with the button, in response to detecting a touch operation at a location on the handwritten portion recognized as the button.

In more detail, the handwritten object processing module 310 detects a touch operation at a location on at least part of the handwritten portion (handwritten portion 66, 67 or 68) corresponding to a certain button in the handwritten object 60. Then, in response to detecting the touch operation at a location on at least the part of the handwritten portion (handwritten portion 66, 67 or 68) corresponding to a certain button, the handwritten object processing module 310 performs a process determined according to a shape of this handwritten portion.

For example, if the handwritten portion 67 is tapped with the fingers or the pen 100, the handwritten object processing module 310 performs a process of playing back certain media data. If the handwritten portion 66 is tapped with the finger or the pen 100, the handwritten object processing module 310 performs a process of skipping backward the current playback position of the media data or changing the media data to be played back to the previous media data. If the handwritten portion 68 is tapped with the finger or the pen 100, the handwritten object processing module 310 performs a process of skipping forward the current playback position of the media data or changing the media data to be played back to the next media data. In this way, for example, a figure of a handwritten button can be used instead of a button of a software player that performs processes related to the play back of media data.

Furthermore, the handwritten object processing module 310 may increase the size of a touched handwritten portion (handwritten portion 66, 67 or 68) or change the color of the touched handwritten portion. Moreover, the handwritten object processing module 310 may move loci of one or more strokes corresponding to the handwritten portion 63 corresponding to the slider, along a direction in which the handwritten portion 63 corresponding to a line segment extends, in accordance with the progress of the play back of media data.

The handwritten object 60 may be displayed on a desktop screen or some other desired screen.

Figure 14:
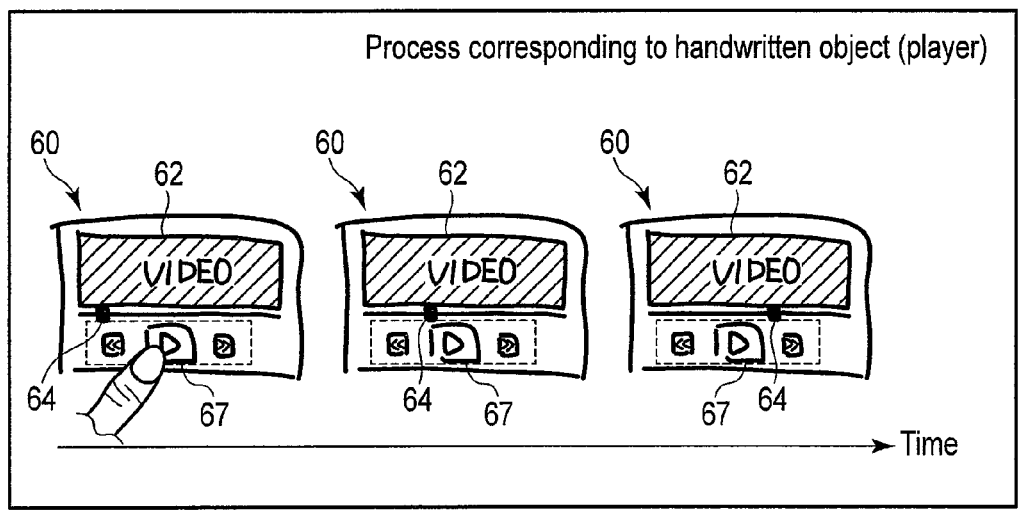
FIG. 14 is an exemplary view for explaining a process which is performed in response to the touch of a finger or a pen on the handwritten object of FIG. 13.

FIG. 14 illustrates an exemplary process determined according to the shape of the handwritten portion (handwritten portion 66, 67 or 68) within the handwritten object (handwritten software player) 60.

It is assumed that a finger tap gesture at a location on the handwritten portion 67 is detected, as illustrated in the left part of FIG. 14. The handwritten object processing module 310 plays back media data (e.g. video) that has been selected by the user in advance. The video is displayed on the handwritten portion 62. The handwritten portion 64 moves in the right direction, in accordance with the progress of the play back of the video.

Figure 15:
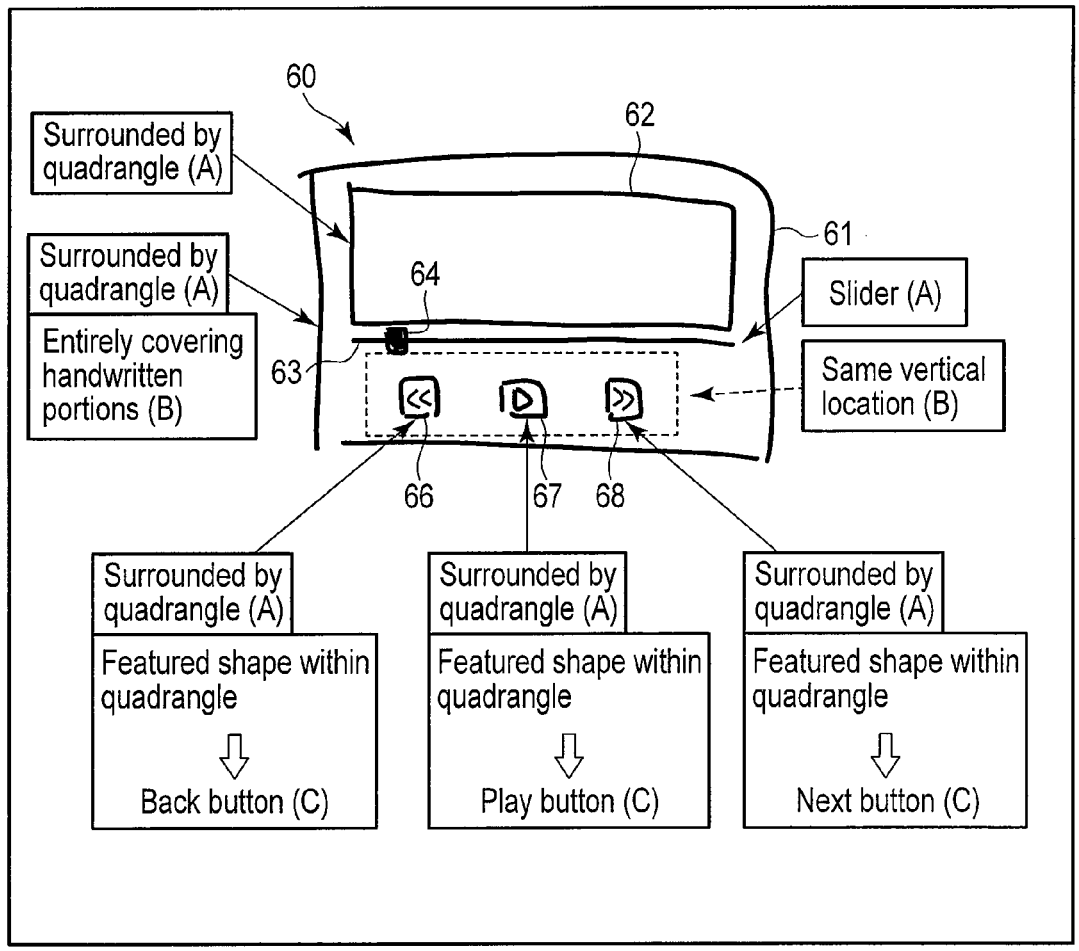
FIG. 15 is an exemplary view for explaining a process of analyzing individual features of a plurality of elements of the handwritten object of FIG. 13.

FIG. 15 illustrates a process of analyzing respective features of plural elements in the handwritten object 60.

The handwritten object recognition module 309 analyzes respective features of plural elements (handwritten elements) in the handwritten object 60 by using template information of a software player, thereby determining some typical featured portions of the handwritten object 60. The handwritten object recognition module 309 makes first and second analyses, similar to the process of analyzing the handwritten clock as described above. First, in the first analysis, the handwritten object recognition module 309 acquires information (A) illustrated in FIG. 15. Specifically, the handwritten object recognition module 309 identifies handwritten portions, each of which has a shape surrounded by a quadrangle, and further identifies a handwritten portion corresponding to the slider's shape.

Then, in the second analysis, the handwritten object recognition module 309 acquires information (B) illustrated in FIG. 15. The information (B) illustrated in FIG. 15 mainly indicates a positional feature of each handwritten element (each handwritten figure), based on a positional relationship between the handwritten elements (handwritten figures). Through the second analysis, for example, the feature information is acquired "plural handwritten portions, each of which has a shape surrounded by a quadrangle, are arranged at the same vertical location", "there is a handwritten portion entirely covering the handwritten portions and having a shape surrounded by a quadrangle," and the like.

Furthermore, in a third analysis, the handwritten object recognition module 309 acquires information (C) illustrated in FIG. 15. Specifically, the handwritten object recognition module 309 recognizes what a handwritten figure in each of the handwritten portions 66, 67 and 68 is intended for, by matching between the handwritten figure in each of the handwritten portions 66, 67 and 68 and a preset figure. In this case, the handwritten portion 66 is recognized as the "back" button, the handwritten portion 67 is recognized as the "play" button, and the handwritten portion 67 is recognized as the "next" button. The above template information of a software player includes conditions, for example, "the play button is contained," as the above third information. Therefore, the handwritten object recognition module 309 can determine that a digital object corresponding to a shape of the handwritten object 60 is a software player.

Figure 16:
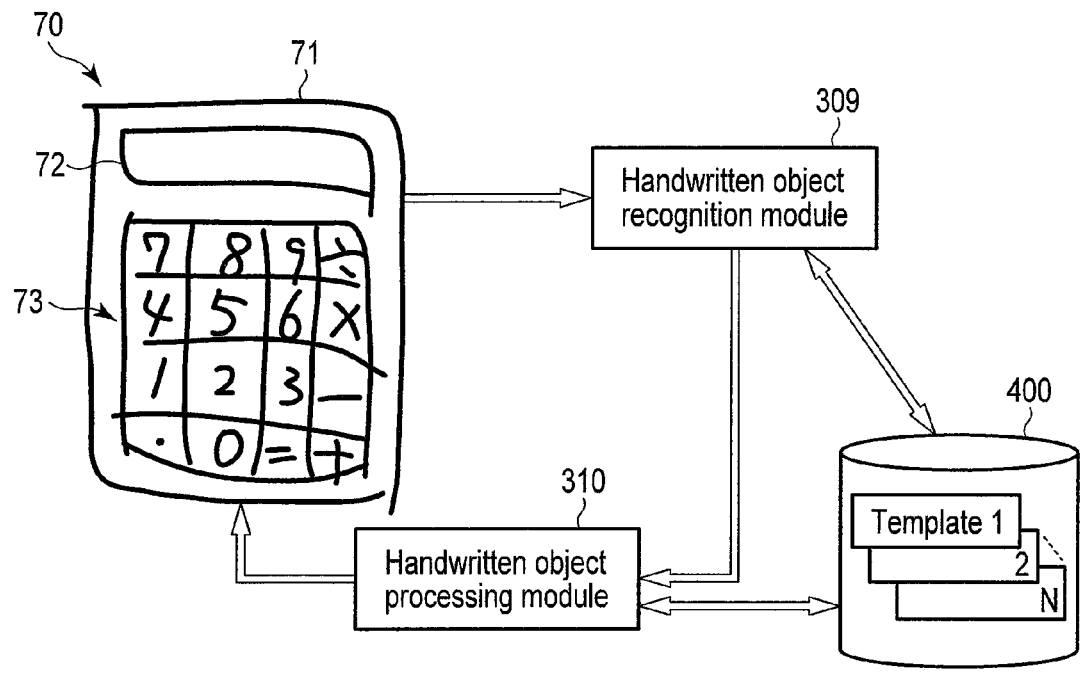
FIG. 16 is an exemplary view for explaining still another process of making a handwritten object act as a digital object, which is performed by the electronic device of the embodiment.

FIG. 16 illustrates an example in which a handwritten object acts as a calculator.

A handwritten object 70 of FIG. 16 includes loci of plural handwritten strokes. In more detail, the handwritten object 70 includes a handwritten portion 71 corresponding to a substantially quadrangular outer frame, a handwritten portion 72 corresponding to a substantially quadrangular inner frame, and a tabular shaped handwritten portion 73 which includes plural handwritten numbers and plural arithmetic symbols. Each of these handwritten portions includes at least a handwritten stroke.

The above template database 400 contains a template of a digital object corresponding to a calculator (calculator template). The handwritten object recognition module 309 can determine that a shape of the handwritten object 70 is a calculator object, by matching between the calculator template and the handwritten object 70. In this case, the handwritten object recognition module 309 may recognize that parts of the tabular shaped handwritten portion 73 which correspond to the handwritten numbers are number input buttons, and may recognize that parts of the tabular shaped handwritten portion 73 which correspond to the handwritten arithmetic symbols are calculation buttons. Moreover, the handwritten object recognition module 309 may recognize the handwritten portion 72 as a display area.

The handwritten object processing module 310 detects a touch operation at a location on at least part of the handwritten portion corresponding to a number input button or a calculation button. In response to detecting the touch operation at location on at least the part of the handwritten portion corresponding to a certain number input button or a certain calculation button, the handwritten object processing module 310 performs a process determined according to a shape of this handwritten portion, for example, (1) a process of inputting a number and entering it in the handwritten portion 72, (2) a process of performing addition, subtraction, multiplication or division and displaying the calculation result on the handwritten portion 72.

Furthermore, the handwritten object processing module 310 may increase the size of the handwritten portion corresponding to the touched number input button/calculation button, or change the color of the touched handwritten portion.

Figure 17:
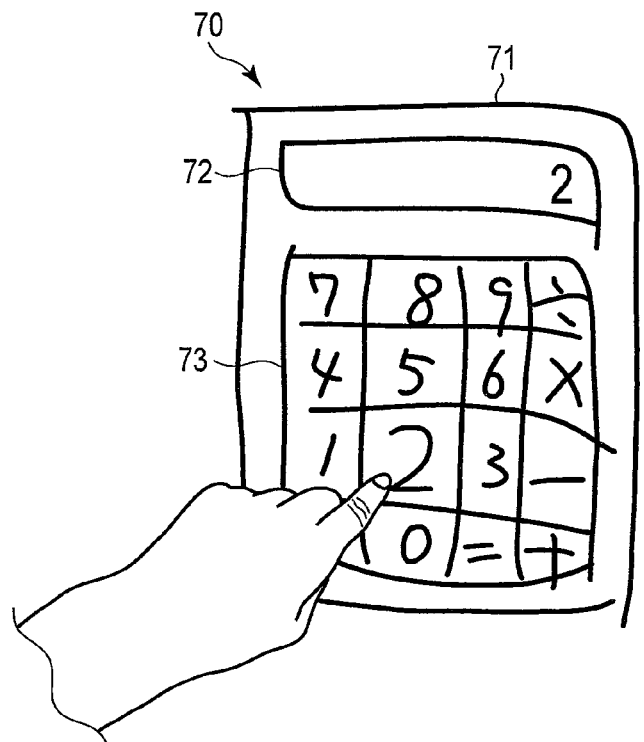
FIG. 17 is an exemplary view for explaining a process which is performed in response to the touch of a finger or a pen on the handwritten object of FIG. 16.

FIG. 17 illustrates an exemplary process determined according to a shape of a handwritten portion corresponding to a number input button/calculation button in the handwritten object (handwritten calculator) 70.

As illustrated in FIG. 17, it is assumed that a finger tap gesture at a location on the handwritten portion corresponding to a handwritten number "2" is detected. The handwritten object processing module 310 enters text corresponding to the number "2" in the handwritten portion 72.

FIG. 18 illustrates a function of moving a handwritten object having the shape of a swing.

A handwritten object 80 of FIG. 18 includes loci of plural handwritten strokes. In more detail, the handwritten object 80 includes plural handwritten portions 81 to 86. Each of the handwritten portions 81 to 86 includes one or more handwritten strokes.

The above template database 400 includes a template of a digital object corresponding to a swing (swing template). The handwritten object recognition module 309 can determine that a shape of the handwritten object 80 is a swing object, by matching between the swing template and the handwritten object 80. In this case, the handwritten object recognition module 309 may recognize that the handwritten portions 84 and 85 are chains or ropes and the handwritten portion 86 is a seat.

The handwritten object processing module 310 detects a touch operation at a location on at least part of the handwritten object 80. In response to detecting the touch operation at the location on at least the part of the handwritten object 80, the handwritten object processing module 310 performs a process determined according to a shape of the handwritten object 80.

FIG. 19 illustrates an exemplary process determined according to a shape of the handwritten object (handwritten swing) 80.

As illustrated in the left part of FIG. 19, it is assumed that a finger tap gesture at a location on at least a part of the handwritten object (handwritten swing) 80 is detected. The handwritten object processing module 310 continuously moves all the handwritten portions 84, 85, and 86, in such a way that the handwritten portion 86 corresponding to the seat repeats swinging back and forth, as illustrated in the central and right parts of FIG. 19.

Next, a description will be given of a functional configuration of the digital notebook application program 202, with reference to FIG. 20.

The digital notebook application program 202 is a WYSIWYG application which can handle handwritten data, and includes a pen locus display processing module 301, a time-series information generation module 302, a page storage processing module 304, a page acquisition processing module 305, a handwritten document display processing module 306, a range selection module 307, a processing module 308, and the like.

The digital notebook application program 202 creates, displays and edits a handwritten document, by using stroke data which are input with use of the touch-screen display 17. The touch-screen display 17 is configured to detect a generation of an event such as "touch (contact)", "move (slide)", "release", etc. The "touch" is an event indicating that the finger or pen 100 has come in contact with the screen. The "move (slide)" is an event indicating that the contact position has been moved while the finger or pen 100 is in contact with the screen. The "release" is an event indicating that the finger or pen 100 has been released from the screen.

The pen locus display processing module 301 and the time-series information generation module 302 receive an event of "touch" or "move (slide)", which is generated by the touch-screen display 17, thereby detecting a handwriting input operation. The "touch" event includes coordinates of a contact position. The "move (slide)" event includes coordinates of a contact position at a destination of movement. Accordingly, the pen locus display process module 301 and time-series information generator 302 can receive coordinate series corresponding to the locus of movement of the contact position from the touch-screen display 17.

The pen locus display processing module 301 functions as a display processor configured to display a handwritten object including plural strokes which are input by handwriting, on the touch-screen display 17. Specifically, the pen locus display processing module 301 receives coordinate series from the touch-screen display 17. Then, based on this coordinate series, the pen locus display processing module 301 displays loci of strokes corresponding to a handwritten object which is written by a handwriting input operation using the pen 100 or the like, on the screen of the LCD 17A in the touch-screen display 17. With the pen locus display processing module 301, not only handwritten characters, but a handwritten object such as handwritten illustration is displayed on the touch-screen display 17.

The time-series information generation module 302 receives the above coordinate series output from the touch-screen display 17, and generates, based on this coordinate series, the above time-series information (a set of pieces of stroke data) having the structure as described in detail with reference to FIG. 4. In this case, the time-series information may be temporally stored in the working memory 401.

The page storage processing module 304 stores the generated time-series information in a storage medium 402, as a handwritten document (handwritten page). The storage medium 402 may be the storage device in the tablet computer 10, the storage device in the personal computer 1, or the storage device in the server 2, as described above.

The page acquisition processing module 305 reads out arbitrary existing time-series information from the storage medium 402. The readout time-series information is transmitted to the handwritten document display processing module 306. The handwritten document display processing module 306 may also functions as the above display processor. The handwritten document display processing module 306 analyzes the time-series information, and displays, on the screen, plural handwritten strokes (e.g. handwritten object such as handwritten illustration) that are based on the analysis result, as a handwritten page.

The range selection module 307 supports an area selection operation which is performed by a user, by using a graphical user interface (GUI). This rang selection operation is an operation of selecting an arbitrary part of the handwritten page on the screen, or an arbitrary handwritten object on the screen. For example, by using the "range selection" tool, the user can surround an arbitrary part on the screen by a quadrilateral frame or a circular frame by the operation of the pen 100. The processing module 308 can perform various functions, including the above handwritten object recognition process, for handwritten strokes within a selection range surround by the quadrilateral or circular frame (or the handwritten object designated by the selection range).

The processing module 308 is provided with the above handwritten object recognition module 309 and handwritten object processing module 310. The handwritten object processing module 310 functions as an execution module configured to executes a process determined according to a shape of a handwritten object on the touch-screen display 17, in response to detecting a touch operation (e.g. a tap operation, etc.) at location on at least part of the handwritten object. The process determined according to a shape of a handwritten object is a process associated with a digital object determined according to the shape of this handwritten object.

For example, in the case where a shape of a handwritten object corresponds to that of a clock, a process of moving one or more parts of handwriting in the handwritten object, which correspond to a hand of a clock, is executed.

For example, in the case where a shape of a handwritten object corresponds to that of the play button of a software player, a process of playing back media data is executed.

The handwritten object recognition module 309 determines which of digital objects corresponds to the shape of the handwritten object. The handwritten object processing module 310 executes a process associated with the digital object that has been determined by the handwritten object recognition module 309.

A flowchart of FIG. 21 illustrates the procedure of a handwritten object process which is executed by the handwritten note application program 202.

The handwritten note application program 202 displays loci of strokes which are input by handwriting, or a handwritten object including these strokes, on the touch-screen display 17 (Step S11). The handwritten note application program 202 recognizes the handwritten object by using the above template database 400 (Step S12).

At Step S12, the handwritten note application program 202 determines a digital object corresponding to a shape of the handwritten object. In this case, the handwritten note application program 202 may determine the digital object corresponding to the shape of the handwritten object, based on a combination of plural featured portions in the handwritten object. Further, at Step S12, the handwritten object recognition process may be applied to all of the strokes displayed on the touch-screen display 17 or only strokes which are designated by a selection range.

The handwritten note application program 202 detects a touch operation (tap gesture, etc) at a location on at least part of a certain handwritten object on the touch-screen display 17 (Step S13). If the touch operation (tap gesture, etc) at the location on at least part of the certain handwritten object is detected ("YES" at Step S13), the handwritten note application program 202 executes a process (action) determined according to the shape of this handwritten object (Step S14).

At Step S14, for example, the handwritten note application program 202 can execute a process of making the handwritten object act as the digital object that has been determined at Step S12. This process may include a process of moving at least part of the handwritten object, or one or more strokes of the plural strokes corresponding to the handwritten object. In this case, the movement of the one or more strokes is defined according to the shape of the handwritten object.

Note that handwritten object recognition process at Step S12 and the process (action) at Step S14 may be performed when the touch operation (tap gesture, etc.) at the location on at least the part of the handwritten object is detected.

Alternately, the handwritten object recognition process at Step S12 may be performed by the server 2 instead of the handwritten note application program 202. In this case, the handwritten note application program 202 needs to transmit to the server 2 plural pieces of stroke data which correspond to plural handwritten strokes to be recognized.

In this embodiment, as described above, a process determined according to a shape of a handwritten object, such as a handwritten illustration, is executed in response to detecting a touch operation at a location on the handwritten object. It is thus possible to equip a handwritten object which is handwriting information, with a function equivalent to a gadget, thereby leading to the efficient utilization of the handwriting information.

A touch operation at the location on the handwritten object may be a touch operation using the finger or a touch operation using the 100. Alternatively, a handwritten object including plural handwritten strokes may be displayed on the screen on the basis of events, the events being input from a first sensor (digitizer 17C) in accordance with a movement of a first object (pen 100) on the screen of the touch-screen display 17. Then, a process determined according to a shape of the handwritten object may be executed on the basis of an event, the event being input from a second sensor (touch panel 17B) in accordance with a touch operation (finger tap gesture) at a location on at least part of the handwritten object on the screen.

Since the various processes according to the embodiments can be implemented using a computer program, the same advantageous effects as with the present embodiment can easily be obtained simply by installing the computer program into an ordinary computer through a computer-readable storage medium which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method comprising:
    displaying a handwritten object on a touch-screen display of an electronic device, the handwritten object comprising a plurality of strokes, the plurality of strokes being input by handwriting;
    detecting a touch operation at a location on at least part of the handwritten object on the touch-screen display;
    comparing a shape of the handwritten object with templates corresponding to respective plurality of applications;
    selecting an application based in part on said comparison;
    assigning an operation from the selected application to a feature of the handwritten object; and
    executing a first process based on the assigned operation using the feature of the handwritten object displayed on the touch-screen display responsive to the detected touch operation,
    wherein the first process comprises moving loci of one or more strokes of the plurality of strokes based in part on the shape of the handwritten object.

2. The method of claim 1, further comprising determining whether a first digital object corresponding to the shape of the handwritten object is a clock or a software player based on a combination of a plurality of featured portions in the handwritten object,
    wherein the executing of the first process comprises executing a process associated with the first digital object.

3. The method of claim 1, wherein if the shape of the handwritten object corresponds to a shape of a clock, the executing of the first process comprises moving loci of one or more first strokes of the plurality of strokes, the first strokes corresponding to a hand of the clock.

4. The method of claim 1, wherein if the shape of the handwritten object corresponds to a shape of a button in a software player, the executing of the first process comprises executing a process associated with the button of the software player, the process associated with the button being related to playing back of media data.

5. The method of claim 4, wherein the executing of the first process comprises moving loci of one or more first strokes of the plurality of strokes in accordance with progress of the play back of the media data, the one or more first strokes corresponding to a slider of the software player.

6. An electronic device comprising:
    a touch-screen display;
    a display processor configured to display a handwritten object on the touch-screen display, the handwritten object comprising a plurality of strokes, the plurality of strokes being input by handwriting; and
    a processor configured to:
        compare a shape of the handwritten object with templates corresponding to respective plurality of applications;
        select an application based in part on said comparison;
        assign an operation from the selected application to a feature of the handwritten object; and
        execute a first process based at least on the assigned operation and the feature of the handwritten object, wherein the first process comprises moving loci of one or more strokes of the plurality of strokes based in part on the shape of the handwritten object.

7. The electronic device of claim 6, wherein the processor is further configured to execute functions of determining whether a first digital object is a clock or a software player based on the shape of the handwritten object and executing a process associated with the first digital object in response to detecting a touch operation.

8. The electronic device of claim 6, wherein if the shape of the handwritten object corresponds to a shape of a clock, the first process comprises moving loci of one or more first strokes of the plurality of strokes, the first strokes corresponding to a hand of the clock.

9. The electronic device of claim 6, wherein if the shape of the handwritten object corresponds to a shape of a button in a software player, the first process comprises executing a process associated with the button of the software player, the process associated with the button being related to playing back of media data.

10. The electronic device of claim 9, wherein the first process comprises moving loci of one or more first strokes of the plurality of strokes in accordance with progress of the play back of the media data, the one or more first strokes corresponding to the slider of the software player.

11. A computer-readable, non-transitory storage medium comprising a computer program configured to be executed by a computer, the computer program controlling the computer to execute functions of:
displaying a handwritten object on the touch-screen display, the handwritten object comprising a plurality of strokes, the plurality of strokes being input by handwriting;
comparing a shape of the handwritten object with templates corresponding to respective plurality of applications;
selecting an application based in part on said comparison;
linking portions of the handwritten object with operations of the selected application; and
executing a first process based on the selected application using the handwritten object displayed on the touch screen,
wherein the computer program controlling the computer is further configured to execute a function of determining whether a first digital object corresponding to the shape of the handwritten object is a clock or a software player based on a combination of a plurality of featured portions in the handwritten object, and
wherein the executing of the first process comprises executing a process associated with the first digital object in response to detecting a touch operation.

12. The storage medium of claim 11, wherein if the shape of the handwritten object corresponds to a shape of the clock, the executing of the first process comprises moving loci of one or more first strokes of the plurality of strokes, the first strokes corresponding to a hand of the clock.

13. The storage medium of claim 11, wherein if the shape of the handwritten object corresponds to a shape of a button in the software player, the executing of the first process comprises executing a process associated with the button of the software player, the process associated with the button being related to playing back of media data.

14. The storage medium of claim 13, wherein the executing of the first process comprises moving loci of one or more first strokes of the plurality of strokes in accordance with progress of the play back of the media data, the one or more first strokes corresponding to a slider of the software player.

* * * * *